Patented Aug. 17, 1943

2,327,185

UNITED STATES PATENT OFFICE 2,327,185

METHOD OF EXTRACTING GLUE AND GELATIN

Donald P. Grettie, Chicago, Ill., assignor to Industrial Patents Corporation, Chicago, Ill., a corporation of Delaware No Drawing. Application June 16, 1939,
Serial No. 279,552

18 Claims. (Cl. 260—118)

This invention relates to a method of extracting gelatinous material from pork skins, hide trimmings, fleshings, sinews, and the like.

One of the objects of this invention is to provide a method of extracting gelatinous material from gelatinous material stock to yield a high test gelatinous material.

Another object of this invention is to provide a method of extracting gelatinous material from gelatinous material stock without the usual cooking step.

Further objects and advantages of my invention will become apparent from the description and claims which follow.

The present invention contemplates the treatment of gelatinous material stock, such as pork skins, hide trimmings, fleshings, sinews, and the like, with a gelatinous material peptizing or liquefying agent for a period sufficient to extract the gelatinous material from the gelatinous material stock followed by a separation of the gelatinous material from the peptizing or liquefying agent.

The term "gelatinous material" is used herein and it is to be understood to designate all grades of animal gelatin and glue including those intermediate products commonly known as "low grade gelatin" and "high grade glue." The term "gelatinous material stock" is used herein and it is to be understood to designate animal waste matter such as snouts, lips, ears, hide trimmings, fleshings, sinews, and the like, a specific example being pork skins.

In the conventional practice of extracting gelatinous material from gelatinous material stock of the type described, for example, hide trimmings, the fresh trimmings are preserved by salting with sodium chloride. The salted trimmings are stored or shipped to the glue factory and may there be stored until required for use. The salted stock must be washed thoroughly to free the stock from the salt before transferring the stock to the lime pits for curing. The curing period requires from four to twelve weeks, depending upon the type of stock, the temperature, and the amount of caustic which is generally employed to fortify the lime. The cured stock is then thoroughly washed and acidified to the correct pH, after which it is transferred to cooking vessels and the gelatinous material extracted with water.

In practicing my invention, the gelatinous material stock is placed in a solution of the peptizing or liquefying agent. If the stock has been preserved by salting with sodium chloride, it is first washed with water to remove the salt, after which the stock is covered with a solution of the peptizing or liquefying agent. On soaking of the gelatinous material stock in the solution of the peptizing or liquefying agent, the stock first swells, and as the gelatinous material is extracted from the stock the stock shrinks. The proportion of gelatinous material extracted is proportional to the concentration of the solution, the temperatures, and the time of the soaking. The liquor containing water, peptizing agent, and gelatinous material is then separated from the gelatinous material stock residue. The gelatinous material may be separated from the peptizing agent or solution of the peptizing agent as by dialysis or precipitation.

Peptizing or liquefying agents which are satisfactory for the purposes of my invention include a wide variety of substances. They may be classified as water soluble salts of divalent metals, certain phenolic compounds, soluble isothiocyanates, soluble salts of aryl sulphonic acids, and compounds having a —$CONH_2$ or —$CSNH_2$ group. Examples of satisfactory water soluble salts of divalent metals are calcium, zinc, and magnesium chlorides, or nitrates, or calcium lactate. Examples of satisfactory phenolic compounds are phenol, salicylic acid, or the sodium salt of salicylic acid. Examples of satisfactory soluble isothiocyanates are ammonium, sodium, and potassium isothiocyanates. Examples of satisfactory soluble salts of aryl sulphonic acids are benzene and naphthalene sulphonates. Examples of satisfactory compounds having the groups —$CONH_2$ or —$CSNH_2$ are urea, thiourea, acetamide, and formamide.

The peptizing or liquefying agents are to be distinguished from hydrolyzing agents, such as the strong mineral acids and alkalies. The peptizing agents may be defined as substances which are capable of converting a jelly into a colloidal solution or sol without chemical degradation or change of the material forming the jelly. Peptization is a physical phenomena which is not accompanied by a chemical change. The hydrolytic agents, such as the mineral acids and alkalies, on the other hand, effect a chemical degradation or chemical change in the material forming the jelly. In many cases, the hydrolytic agents effect an addition of certain numbers of molecules of water to the material forming the jelly, and also split up the molecules of the material forming the jelly. By the use of the peptizing or liquefying agents the jelly is not changed chemically and it is not hydrolyzed, and, as a result, the gelatinous material obtained by my process is of a higher quality than that prepared with a hydrolyzing agent.

Although any desired concentration of the peptizing or liquefying agents may be employed, it is apparent that the higher concentrations are more desirable since the gelatinous material extracted is directly proportional to the concentration of the peptizing agent in the solution employed in the extraction period. For example, 30 per cent to 50 per cent solutions of the water soluble salts of divalent metals and compounds having the group —$CONH_2$ or —$CSNH_2$ will extract about 50 per cent of the available gelatinous material from pork skins in about two days. Pork skins contain about 25 per cent to 30 per cent available gelatin, about 12 per cent gelatinous material, based on the weight of the skins, being extracted in two days. Practically all of the available gelatinous material will be extracted in thirty days. If a higher test gelatinous material is desired, the gelatinous material stock may be subjected to extraction in 30 to 50 per cent solutions for two to three days and then transferred to fresh solutions. Solutions containing less than about 15 per cent of the liquefying agent are satisfactory, but require greater extraction periods and are, therefore, less desirable commercially.

The final liquor containing the peptizing agent, water, and the gelatinous material is separated from the gelatinous material stock residue as by filtration or by draining the liquor from the stock residue. The separated liquor may be placed in a porous container, such as a Cellophane bag, which is then immersed in water. As is well known, the peptizing agent, for example, the calcium salts, being a crystalloid, will pass through the porous membrane into the water, leaving the liquor containing water and the gelatinous material in the porous bag. The liquor may then be evaporated and dried in any desired manner to prepare a dried gelatinous material.

The gelatinous material may be precipitated from the liquor containing water, peptizing agent, and gelatinous material by the addition to the liquor of alcohol, acetone, or a saturated solution of ammonium sulphate, and the gelatinous material separated from the solution.

In a specific example, pork skins were placed in a solution containing from 30 per cent to 50 per cent urea and held at room temperature for about two days. At the end of the two day period, about 50 per cent of the available gelatinous material had been extracted from the pork skins. Practically all of the gelatinous material was extracted by holding the pork skins in the urea solution for a period of about thirty days. The liquor containing water, urea, and gelatinous material was separated from the gelatinous material stock residue. The gelatinous material was separated from the urea solution by dialysis or by precipitation. Although the gelatinous material extracted in this manner did not have an exceedingly high test, it did have a very high clarity.

About 50 per cent of the available gelatinous material was extracted from pork skins which had been placed in a 30 per cent to 50 per cent solution of calcium nitrate and held at room temperature for about two days. The liquor containing water, calcium nitrate, and gelatinous material was separated from the gelatinous material stock residue. Gelatinous material was obtained from a portion of the liquor by the addition of alcohol or a saturated solution of ammonium sulphate. Gelatinous material was also separated from another portion of the liquor by placing the liquor in a Cellophane bag and suspending the Cellophane bag in water to permit the calcium nitrate to be separated from the gelatinous material by dialysis. By removing the pork skins from the liquor and placing them in successive fresh solutions of calcium nitrate a higher test gelatinous material was obtained. The gelatin extracted from pork skins by means of a calcium nitrate solution had a high test and good clarity.

Although any of the peptizing agents mentioned above may be employed, I prefer to employ urea, formamide, and the water soluble salts of divalent metals, for example, the water soluble salts of calcium.

I claim:

1. The method of extracting gelatinous material from gelatinous material stock which comprises soaking the stock in an aqueous solution of a peptizing agent at normal temperatures and for a sufficient period of time to extract the gelatinous material from the stock and thereafter separating the solution containing the extracted gelatinous material from the gelatinous material stock residue.

2. The method of extracting gelatinous material from gelatinous material stock which comprises soaking the stock in an aqueous solution of a salt of a divalent metal at normal temperatures and for a sufficient period of time to extract the gelatinous material from the stock and thereafter separating the solution containing the extracted gelatinous material from the gelatinous material stock residue.

3. The method of extracting gelatinous material from gelatinous material stock which comprises soaking the stock in an aqueous solution of a calcium salt at normal temperatures and for a sufficient period of time to extract the gelatinous material from the stock and thereafter separating the solution containing the extracted gelatinous material from the gelatinous material stock residue.

4. The method of extracting gelatinous material from gelatinous material stock which comprises soaking the gelatinous material stock in an aqueous solution of zinc chloride at normal temperature and for a sufficient period of time to extract the gelatinous material.

5. The method of extracting gelatinous material from gelatinous material stock which comprises soaking the stock in an aqueous solution of calcium nitrate at normal temperatures and for a sufficient period of time to extract the gelatinous material from the stock and thereafter separating the solution containing the extracted gelatinous material from the gelatinous material stock residue.

6. The method of extracting gelatinous material from gelatinous material stock which comprises soaking the gelatinous material stock in an aqueous solution of magnesium chloride at normal temperature and for a sufficient period of time to extract the gelatinous material.

7. The method of extracting gelatinous material from gelatinous material stock which comprises soaking the gelatinous material stock in an aqueous solution of a magnesium salt at normal temperature and for a sufficient period of time to extract the gelatinous material.

8. The method of extracting gelatinous material from gelatinous material stock which comprises soaking the gelatinous material stock in an aqueous solution of a zinc salt at normal temperature and for a sufficient period of time to extract the gelatinous material.

9. The method of preparing gelatinous material from gelatinous material stock which comprises extracting the gelatinous material from the gelatinous material stock by soaking the stock in an aqueous solution of a peptizing agent at normal temperatures and for a sufficient period of time to extract the gelatinous material, separating the liquor containing water, peptizing agent and gelatinous material from the gelatinous material stock residue, and separating the gelatinous material from the peptizing agent.

10. The method of preparing gelatinous material from gelatinous material stock which comprises extracting the gelatinous material from the gelatinous material stock by soaking the stock in an aqueous solution of a peptizing agent at normal temperatures and for a sufficient period of time to extract the gelatinous material, separating the liquor containing water, peptizing agent, and gelatinous material from the gelatinous material stock residue, and separating the gelatinous material from the peptizing agent by dialysis.

11. The method of preparing gelatinous material from gelatinous material stock which comprises extracting the gelatinous material from the gelatinous material stock by soaking the stock in an aqueous solution of a peptizing agent at normal temperatures and for a sufficient period of time to extract the gelatinous material, separating the liquor containing water, peptizing agent and gelatinous material from the gelatinous material stock residue, and precipitating the gelatinous material from the solution.

12. The method of preparing gelatinous material from gelatinous material stock which comprises extracting the gelatinous material from the gelatinous material stock by soaking the stock in an aqueous solution of a salt of a divalent metal at normal temperatures and for a sufficient period of time to extract the gelatinous material, separating the liquor containing water, salt and gelatinous material from the gelatinous material stock residue, and separating the gelatinous material from the salt.

13. The method of preparing gelatinous material from gelatinous material stock which comprises extracting the gelatinous material from the gelatinous material stock by soaking the stock in an aqueous solution of a calcium salt at normal temperatures and for a sufficient period of time to extract the gelatinous material, separating the liquor containing water, salt, and gelatinous material from the gelatinous material stock residue, and separating the gelatinous material from the salt.

14. The method of extracting gelatinous material from gelatinous material stock, which comprises soaking the stock in an aqueous solution containing at least 15 per cent of a peptizing agent at normal temperatures and for a sufficient period of time to extract the gelatinous material from the stock and thereafter separating the solution containing the extracted gelatinous material from the gelatinous material stock residue.

15. The method of extracting gelatinous material from gelatinous material stock which comprises soaking the stock in an aqueous solution containing at least 15 per cent of a water soluble salt of a divalent metal at normal temperatures and for a sufficient period of time to extract the gelatinous material from the stock and thereafter separating the solution containing the extracted gelatinous material from the gelatinous material stock residue.

16. The method of extracting gelatinous material from gelatinous material stock which comprises soaking the stock in an aqueous solution containing at least 15 per cent of a calcium salt at normal temperatures and for a sufficient period of time to extract the gelatinous material from the stock and thereafter separating the solution containing the extracted gelatinous material from the gelatinous material stock residue.

17. The method of extracting gelatinous material from gelatinous material stock which comprises soaking the stock in an aqueous solution containing at least 15 per cent of calcium nitrate at normal temperatures and for a sufficient period of time to extract the gelatinous material from the stock and thereafter separating the solution containing the extracted gelatinous material from the gelatinous material stock residue.

18. The method of preparing gelatinous material from gelatinous material stock which comprises extracting the gelatinous material from the gelatinous material stock by soaking the stock in an aqueous solution containing at least 15 per cent of a peptizing agent at normal temperatures and for a sufficient period of time to extract the gelatinous material from the stock, separating the liquor containing water, peptizing agent and gelatinous material from the gelatinous material stock residue and separating the gelatinous material from the peptizing agent.

DONALD P. GRETTIE.